2,935,853

EROSION CONTROL

Lloyd E. Weeks, Union, Ohio, and Clyde L. Wilson, Kirkwood, Mo., assignors to Monsanto Chemical Company, St. Louis, Mo., a corporation of Delaware No Drawing. Application June 8, 1953
Serial No. 360,347

8 Claims. (Cl. 61—35)

This invention relates to new and useful procedures for minimizing water and wind erosion of surface soils, and for arresting presently occurring natural erosions. More specifically, the invention relates to a surface treatment of soils which, in addition to rendering the surface soil stable to erosion, does not interfere with growth of crops on the said soils.

The need for an inexpensive and readily practicable method of preventing losses of agricultural soils through the action of wind and surface water has long been urgent. Soils of poor physical structure containing minute particles in unaggregated form are readily eroded by the displacement of said particles and their suspension in the atmosphere or in water contacting the soil. Soils of average structure in which the aggregated particles are unstable may have the aggregates broken down by the force of running water or by raindrop impact. Even good fertile soils, which are normally stable to erosion, may be seriously damaged when subjected to severe natural phenomenon, for example, floods and torrential rains. Once the covering vegetation is removed, entirely or in part, by erosive action, the damage through loss of soil is accelerated, and it becomes extremely difficult to recover control of the erosion.

It has now been found that soils may be conditioned for the improvement of tilth, increased water retention and aeration, and the prevention of slaking and crusting by a treatment with a mixture of a water-soluble salt of alginic acid and a finely divided expanding lattice clay. This mixture, after deposition on the soil, is readily absorbed on a large number of soil particles thereby rendering soil aggregates resistant to the slaking and eroding effects of water. Soils comprised of large numbers of such stable aggregates exhibit a marked improvement in resistance to wind and water erosion.

The expanding lattice clays are those which, when contacted with water separate into individual crystals which are readily dispersed in the water and spread out to cover the surface of the normal soil with a complete and uniform clay film. When used in the presence of the said alginic acid salts the clay film is stabilized by having the individual crystals tied into the structure by adsorption of the polymer molecules at one or more sites on many different clay particles.

The clays included within the scope of the expression "expanding lattice clays" include the minerals known and used commercially under the name "bentonite." This generic expression includes various expanding lattice minerals, such as montmorillonite, hectorite, saponite and nontronite, the crystals of which are flat plate-like structures which expand substantially in the presence of water. The expansion property of clays to ascertain whether they are included within the scope of the expression "expanding lattice clays" may be measured by X-ray diffraction, the useful clays being those in which the c-axis when saturated with water reaches a maximum greater than 25 angstroms.

Suitable water-soluble salts of alginic acid for the practice of this invention are the water-soluble salts, for example, the sodium, potassium, and ammonium salts of alginic acid.

The method of preventing erosion by the use of the compositions described and claimed in this application may involve the use of mixtures of water-soluble salts of alginic acid and the expanding lattice clays, preferably in solid pulverulent form. When used in solid form the expanding lattice clays and the water-soluble salts of alginic acid are mixed in suitable proportions, for example, more than three percent and up to 100 percent of the water-soluble alginate (based on the weight of the clay). Mixtures of optimum utility are those wherein the water-soluble salt of alginic acid is present to the extent of from 5 to 20 percent of the clay.

The solid erosion control composition is applied to the surface of the soil subject to erosion by any of a wide variety of spreading apparatus used in the agricultural field, for example fertilizer spreaders, seed drills, and the like. It is generally desirable for the composition to be applied uniformly to the surface of the soil rather than to be mixed within the body of the surface soil. Although the application of the mixture of expanding lattice clay and alkali-metal salt of alginic acid is preferred, separate applications of each component may be used, for example the application of the clay to the surface soil and thereafter spreading the alkali-metal salt of alginic acid on top of the clay. Irrespective of how the application of the alkali-metal salt of alginic acid and clay to the surface of the soil is made, it is generally desirable to wet the composition, either artificially or by natural occurrence of rainfall, to minimize losses through action of wind and to accelerate the reaction between the composition and the soil.

One method of using the soil erosion compositions involves the dispersing of the mixture of expanding lattice clay and the alkali-metal salt of alginic acid in water and applying the slurry so prepared on the surface of the soil by any type of a sprinkling apparatus. This method of application may conveniently be effected by spraying with a stream of water from a tank trunk or from any other water source and injecting the alginate and expanding lattice clay into the stream of water close to the sprinkling nozzle. Obviously, the alginate and expanding lattice clay may be injected into the stream of water at separate points or they may be premixed and injected as a single composition. The water slurry application is sometimes advantageous because the thin aqueous slurry permits the penetration of the alginate and clay to a slight extent throughout the entire surface and any apertures in the earth's surface such as cracks, seams or perforations will be effectively filled with the active ingredients. The aqueous slurry technique often permits a more uniform and more continuous application than is achieved by the solid powder distribution method.

The aqueous slurry technique may also be modified by mixing seed and fertilizer with the aqueous slurry. In this manner slopes to be planted with grass may be seeded, fertilized and stabilized to erosion in a single operation. Generally, where grass is to be grown on the surface being treated, it is desirable to use from 50 to 100 pounds per acre of the mixture of alkali-metal salts of alginic acid and expanding lattice clay. On steep slopes, for example road shoulders, or earth embankments, levees, and road cuts through high ridges more of the composition, for example as much as 2000 pounds per acre of the composition is applied.

In the practice of this erosion control method frequently difficulties may be encountered due to the cracking of the surface. This is caused by the excessive drying through solar evaporation. If the cracking is accompanied by contraction, the surface layer may curl and expose the original soil surface resulting in loss of part of the beneficial effect. This cracking and curling may be minimized by using the alginate-bentonite mixtures in the presence of a small amount of a fibrous material, such as paper pulp, asbestos, newspaper strips, and the like. Preferred methods of using this modification of the invention may involve the addition of the fiber to the pulverulent mixture or it may involve the addition to the slurry of the alginate-bentonite mixture in water.

Under certain extreme conditions the alginate-bentonite compositions may be subject to partial destruction by bacteria residing in the soil. In these circumstances, small proportions of bactericides will be found to increase the longevity of the compositions.

The invention will be further described with respect to specific experiments. Soil beds were prepared from an erosive silt by screening the soil to remove stones and other foreign matter, and depositing the soil in a container which was disposed at a slope of 15°. The surface of the test beds was treated with mixtures of alignates and clays by preparing slurries and applying the dispersions uniformly over the soil surface. The controls without alignates or clays were surface treated with the same quantity of water. The soil beds were then subjected to artificial rainfall which was standardized by establishing a large number of uniformly spaced drop sources and rotating the soil bed. Natural conditions were further simulated by having a flue conduct additional quantities of water across the rotating beds to provide the effect of drainage water from higher ground which is an added factor in erosion causes. All of the soil washed from the soil beds was collected, dried and weighed.

*Example 1*

Six soil beds were each treated with 2.5 percent slurry of one part by weight of sodium alginate and nine parts of bentonite. The slurry was applied in amount equal to 5000 gallons per acre. The control soil bed was treated without either the algin or clay. All of the soil beds were subjected to artificial rainfall at the rate of 2.18 inches per hour for a period of 30 minutes. The following table shows the loss of soil in tons per acre observed in these experiments.

| Sodium Alginate, lbs./acre | Bentonite, lbs./acre | Soil Loss, tons/acre |
|---|---|---|
| 100 (low viscosity [1])* | 900 | 1.5 |
| 100 (extra low visc.[2]) | 900 | 0.5 |
| 100 (med. visc.[3]) | 900 | 0.5 |
| 100 (high visc.[4]) | 900 | 0.3 |
| 100 (high visc.[5]) | 900 | 0.1 |
| Control | | 13.4 |

*The products employed in the tests were those sold by The Kelco Company under the trademarks, Kelgin LV[1], Kelgin XL[2], Kelgin[3], Keltex[4], Kelcosol[5]. Keltex and Kelcosol, although both are high viscosity compounds, differ in that Kelcosol is a fibrous algin and Keltex a standard refined powder.

*Example 2*

Using the procedure described in the preceding example, experiments were conducted to show the effect of addition of fibrous materials to the algin-bentonite mixture, and a comparison with a satisfactory erosion control using the algin-bentonite mixture alone. This experiment utilized artificial rainfall at the rate of 1.83 inches per hour for a 30 minute period. All other conditions were the same as employed before. Shredded newspaper was used to supply the linter.

| Sodium Alginate,[1] lbs./acre | Bentonite, lbs./acre | Linter, lbs./acre | Soil Loss, tons/acre |
|---|---|---|---|
| 50 | 950 | 100 (paper) | 1.6 |
| 75 | 925 | 100 | 0.2 |
| 100 | 900 | 100 | 0.1 |
| 100 | 900 | | 1.8 |
| Control | | | 16.2 |

[1] The product employed in these tests was that sold by The Kelco Company under the trademark, Kelcosol, described as a fibrous Kelco algin.

What is claimed is:
1. A method of minimizing erosion of a soil surface which comprises coating the soil surface with an aqueous slurry of a mixture of an expanding lattice clay and from 3 to 100 percent (based on said clay) of a water-soluble salt of alginic acid.

2. A method of minimizing erosion of a soil surface which comprises coating the soil surface with an aqueous slurry of a mixture of bentonite and from 5 to 20 percent (based on said clay) of an alkali-metal salt of alginic acid.

3. A method of minimizing erosion of a soil surface which comprises coating the soil surface with a mixture of an expanding lattice clay, and from 5 to 20 percent (based on the said clay) of a water-soluble salt of alginic acid and a fibrous material.

4. The method defined by claim 2 wherein the alkali-metal salt of alginic acid is sodium alginate.

5. The method defined by claim 2 wherein the alkali-metal salt of alginic acid is potassium alginate.

6. The method defined by claim 1 wherein the water-soluble salt is ammonium alginate.

7. The method defined by claim 3 wherein the fibrous material is paper pulp.

8. The method defined by claim 3 wherein the fibrous material is asbestos.

References Cited in the file of this patent
UNITED STATES PATENTS

| | | |
|---|---|---|
| 2,047,197 | Fordyce | July 14, 1936 |
| 2,320,954 | Sullivan | June 1, 1943 |
| 2,570,537 | Finch | Oct. 9, 1951 |
| 2,592,554 | Frankenburg | Apr. 15, 1952 |

FOREIGN PATENTS

| | | |
|---|---|---|
| 900,961 | France | July 13, 1945 |
| 641,280 | Great Britain | Aug. 9, 1950 |
| 978,513 | France | Apr. 16, 1951 |
| 473,047 | Canada | Apr. 24, 1951 |

OTHER REFERENCES

Volclay Bentonite, Data No. 229, Sup. B, pp. 1–3, 1938, by American Colloid Co. and Data No. 202, page 1.

U.S. Bureau of Mines Technical paper No. 609, "Bentonite: Its Properties, Mining, Preparation, and Utilization," 1940.